United States Patent

(12) United States Patent
Park et al.

(10) Patent No.: US 11,927,675 B2
(45) Date of Patent: Mar. 12, 2024

(54) SYSTEM AND METHOD OF CONTROLLING WHEEL LOADER

(71) Applicant: HD HYUNDAI INFRACORE CO., LTD., Incheon (KR)

(72) Inventors: Kwangseok Park, Incheon (KR); Yeonhaeng Heo, Incheon (KR); Joonkeun Park, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 373 days.

(21) Appl. No.: 17/152,222

(22) Filed: Jan. 19, 2021

(65) Prior Publication Data
US 2021/0223400 A1 Jul. 22, 2021

(30) Foreign Application Priority Data

Jan. 20, 2020 (KR) .................. 10-2020-0007128

(51) Int. Cl.
*G01S 17/931* (2020.01)
*E02F 9/20* (2006.01)
*E02F 9/26* (2006.01)
*G01S 13/86* (2006.01)
*G01S 13/931* (2020.01)

(52) U.S. Cl.
CPC .......... *G01S 17/931* (2020.01); *E02F 9/2004* (2013.01); *E02F 9/262* (2013.01); *G01S 13/867* (2013.01); *G01S 13/931* (2013.01)

(58) Field of Classification Search
CPC .... G01S 17/931; G01S 13/867; G01S 13/931; E02F 9/2004; E02F 9/262; E02F 3/431; E02F 9/2025; B60W 40/02; G06V 20/58
See application file for complete search history.

(56) References Cited

U.S. PATENT DOCUMENTS

2017/0002540 A1  1/2017 Fletcher et al.
2017/0286763 A1  10/2017 Fukuda et al.
(Continued)

FOREIGN PATENT DOCUMENTS

EP  3412837 A1  12/2018
JP  2017-78315 A  4/2017
(Continued)

OTHER PUBLICATIONS

Extended European Search Report dated May 27, 2021 for corresponding European Patent Application No. 21152572.0, citing the above reference(s).

*Primary Examiner* — Ig T An
(74) *Attorney, Agent, or Firm* — Hauptman Ham, LLP

(57) ABSTRACT

A control system for a wheel loader includes an upper sensor installed in a driver cabin to obtain shape information data for an object in front of the driver cabin, a lower sensor installed in a front body to obtain shape information data for an object in front of the front body, a work apparatus position detection portion configured to detect a position of a work apparatus connected rotatably to the front body, and an obstacle detection control device configured to receive the shape information data from the upper sensor and the lower sensor and configured to calculate a distance to the object based on the information data of any one selected from the upper sensor and the lower sensor according to the detected position of the work apparatus.

10 Claims, 7 Drawing Sheets

(56) References Cited

U.S. PATENT DOCUMENTS

| | | | |
|---|---|---|---|
| 2018/0106709 A1 | 4/2018 | Cherney | |
| 2018/0142441 A1 | 5/2018 | Berry et al. | |
| 2019/0093321 A1* | 3/2019 | Hiekata | E02F 3/963 |
| 2019/0150357 A1* | 5/2019 | Wu | H04N 7/188 |
| 2021/0002863 A1* | 1/2021 | Sakuta | E02F 9/2271 |

FOREIGN PATENT DOCUMENTS

| | | | |
|---|---|---|---|
| KR | 10-2009-0030479 A | 3/2009 | |
| WO | 2018/136889 A8 | 7/2018 | |
| WO | WO-2018136889 A1 * | 7/2018 | E02F 3/32 |

* cited by examiner

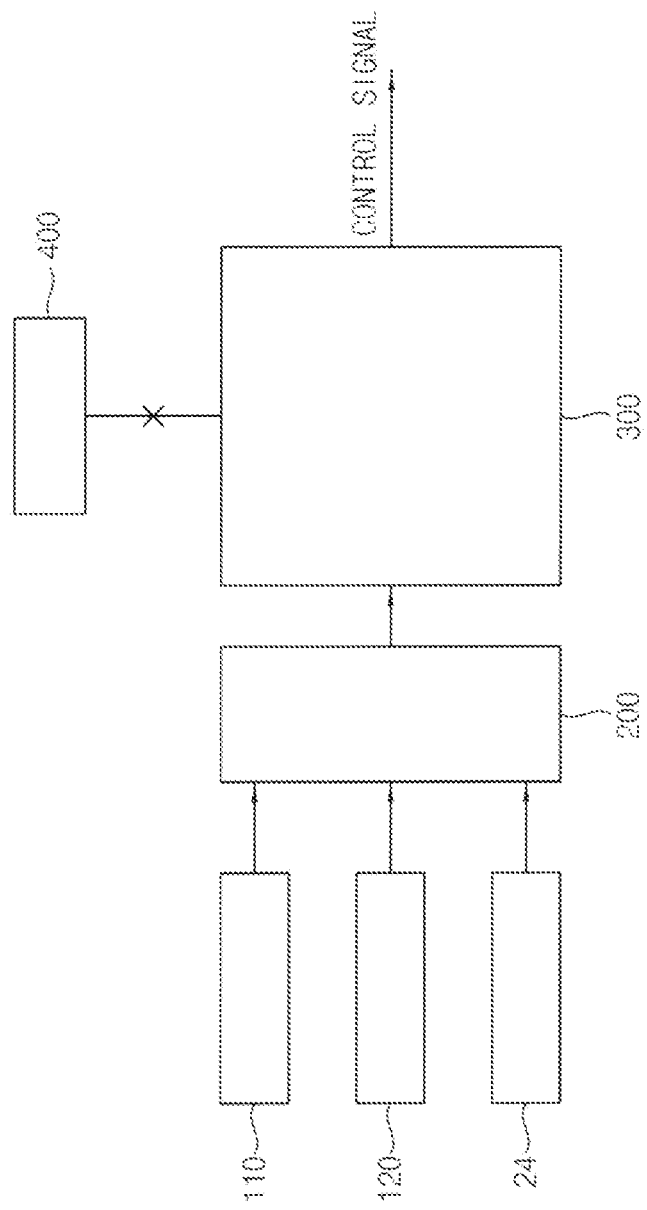

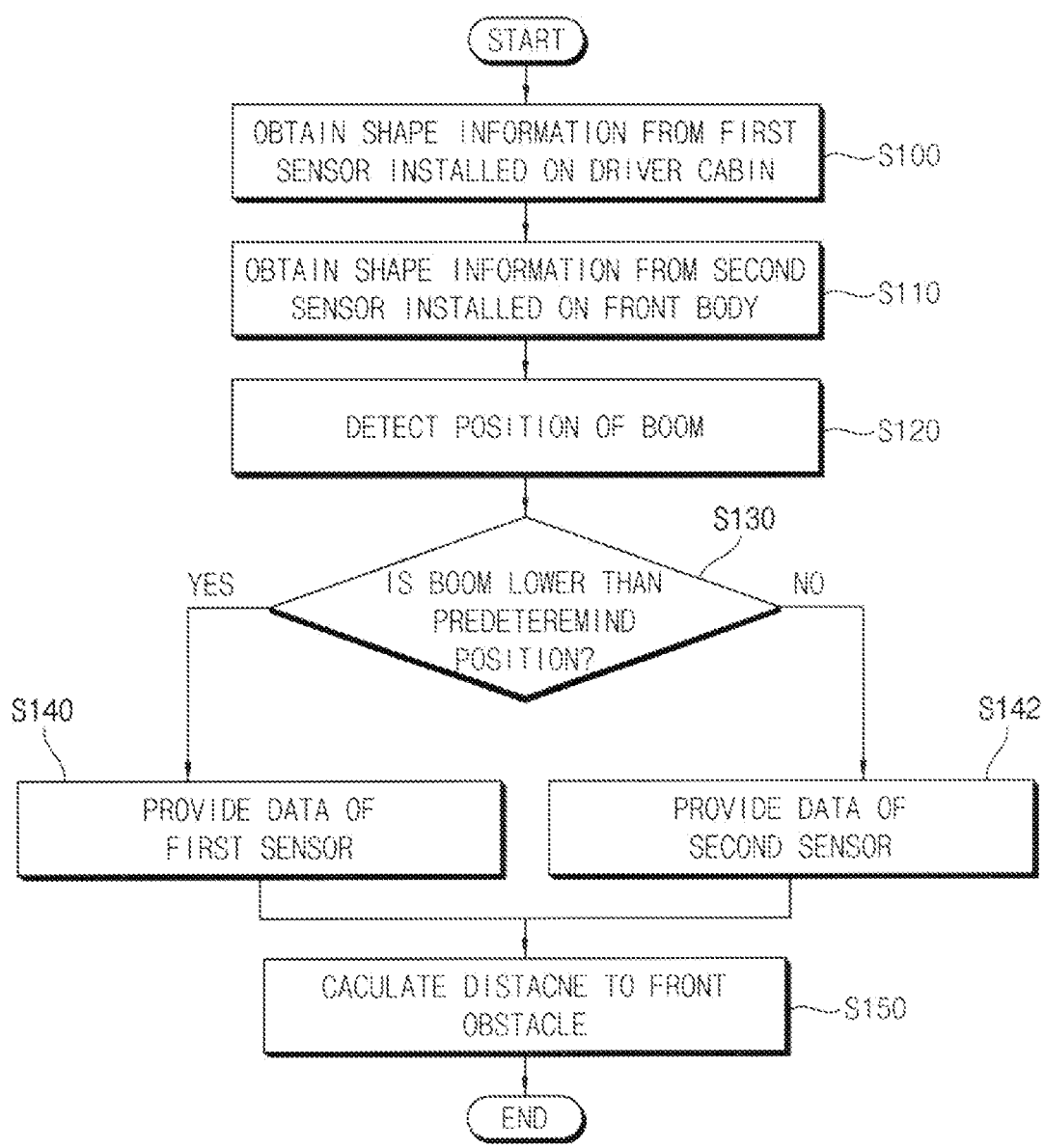

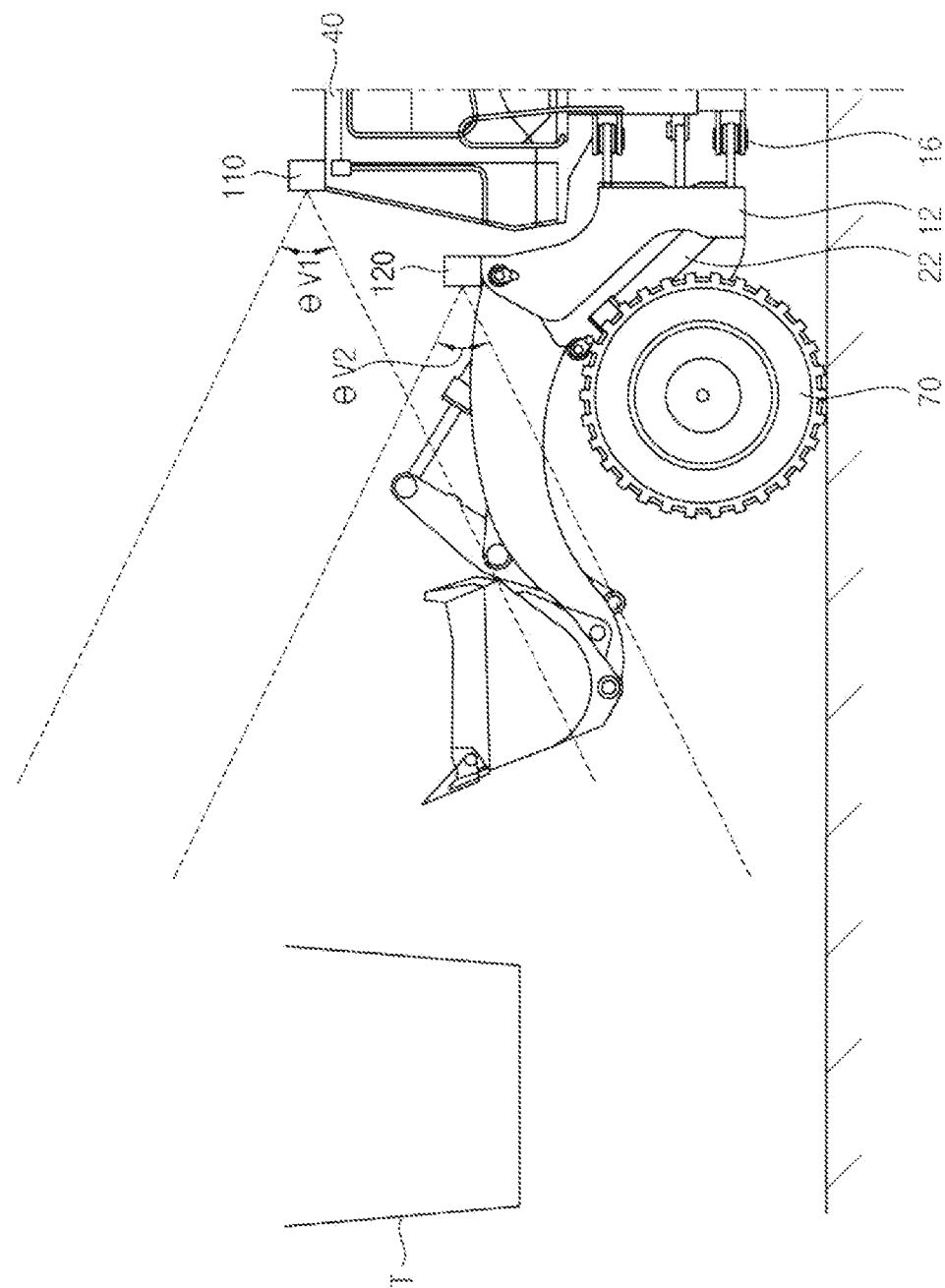

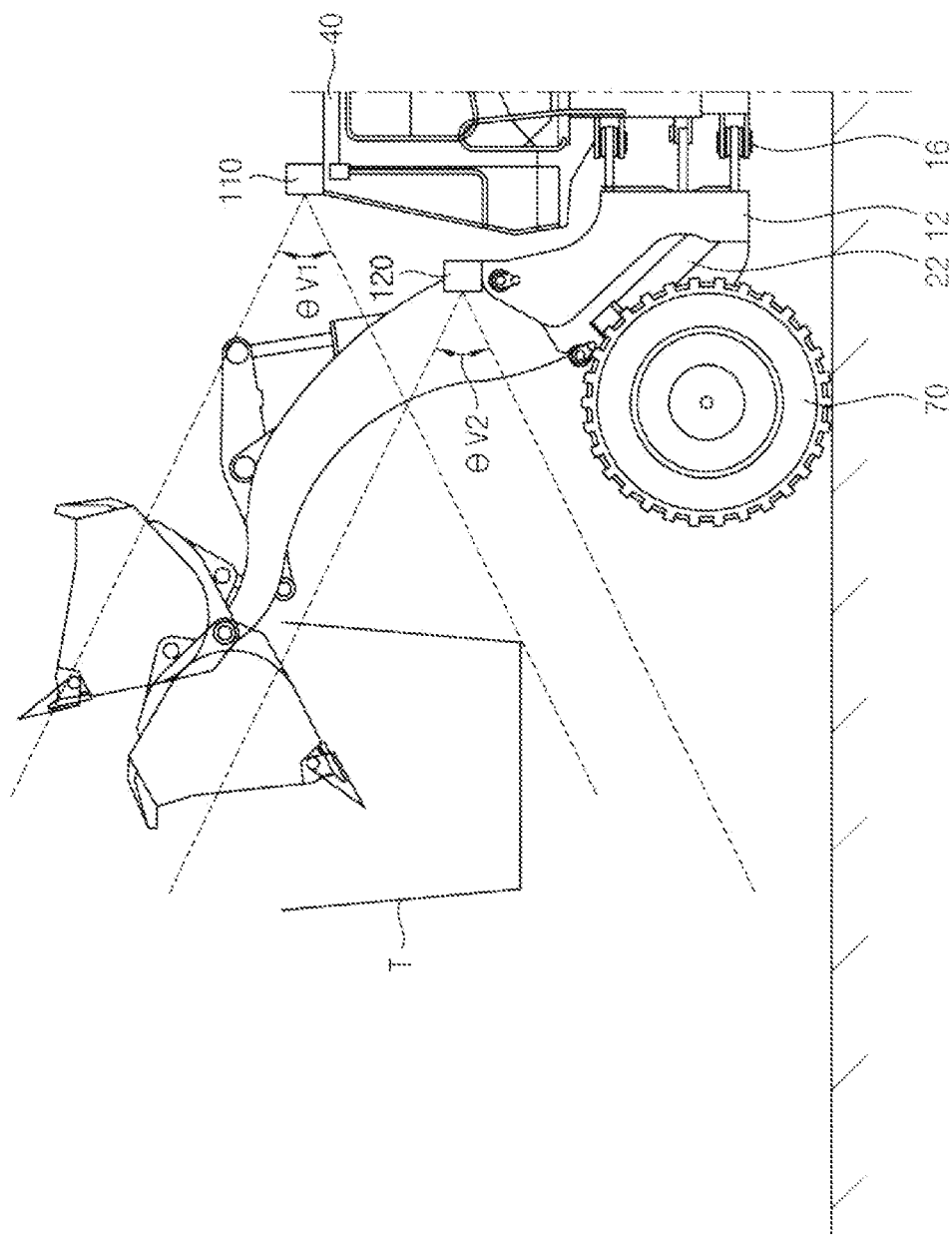

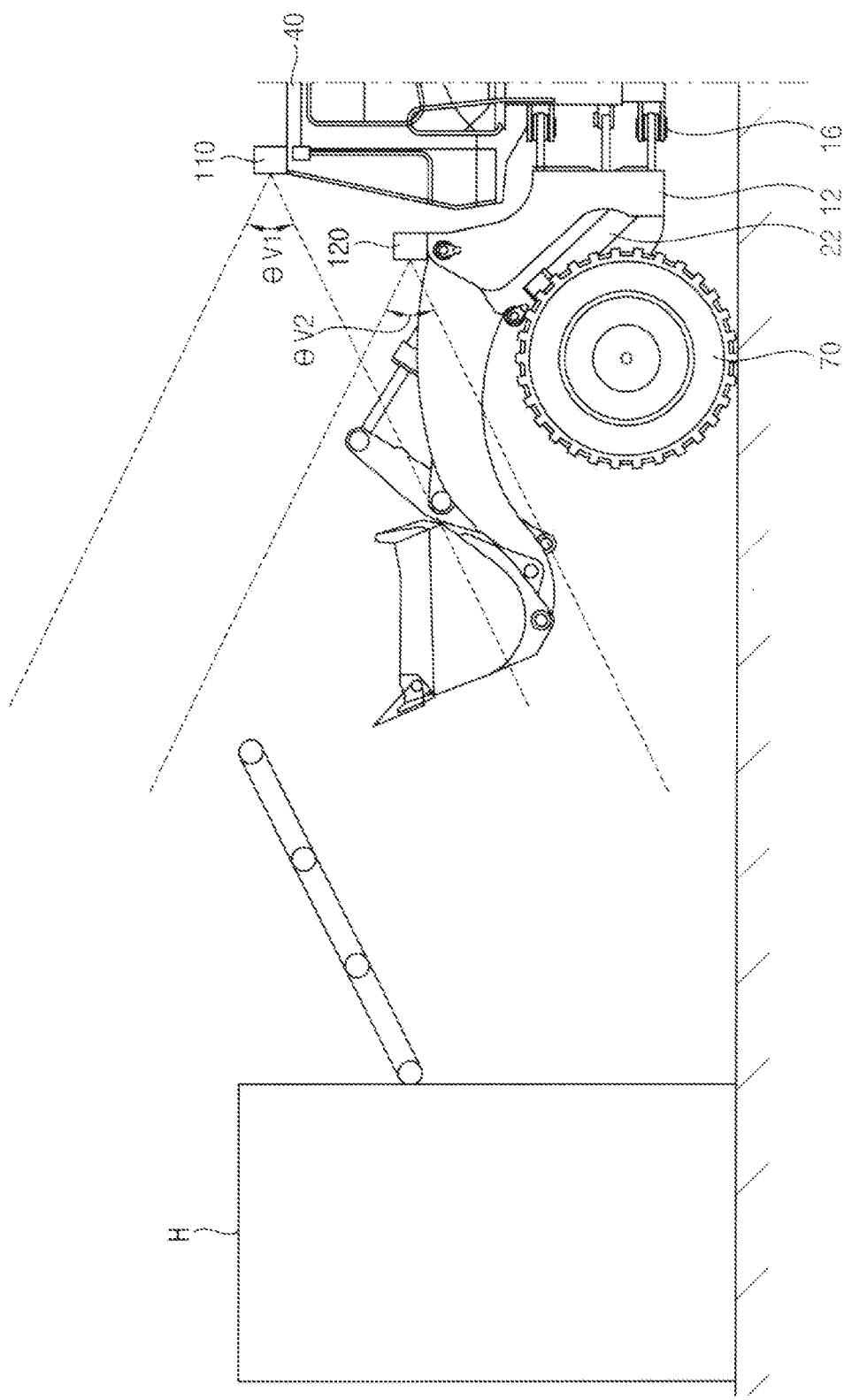

SYSTEM AND METHOD OF CONTROLLING WHEEL LOADER

PRIORITY STATEMENT

This application claims priority under 35 U.S.C. § 119 to Korean Patent Application No. 10-2020-0007128, filed on Jan. 20, 2020 in the Korean Intellectual Property Office (KIPO), the contents of which are herein incorporated by reference in their entirety.

BACKGROUND

1. Field

Example embodiments relate to a control system and method for a wheel loader. More particularly, example embodiments relate to a control system for recognizing a front obstacle during loading or dumping of a wheel loader and a method of controlling the wheel loader using the same.

2. Description of the Related Art

Wheel loaders are widely used in construction sites to excavate and transport loads such as soil, sand, etc., and to perform operations of loading them into a cargo vehicle such as a dump truck. During such loading operations, the wheel loader must approach the truck while lifting a bucket loaded with the load. At this time, a driver's front view may be limited by a work apparatus such as the lifted bucket. In addition, when the wheel loader attempts to perform an unmanned automation work, a device for accurately measuring a distance to a front obstacle such as the truck may be required.

SUMMARY

Example embodiments provide a control system for a wheel loader that can accurately recognize a distance to a front obstacle to improve work efficiency and effectively control a vehicle approach distance during an unmanned automated work.

Example embodiments provide a control method for a wheel loader using the control system.

According to example embodiments, a control system for a wheel loader includes an upper sensor installed in a driver cabin to obtain shape information data for an object in front of the driver cabin, a lower sensor installed in a front body to obtain shape information data for an object in front of the front body, a work apparatus position detection portion configured to detect a position of a work apparatus connected rotatably to the front body, and an obstacle detection control device configured to receive the shape information data from the upper sensor and the lower sensor and configured to calculate a distance to the object based on the information data of any one selected from the upper sensor and the lower sensor according to the detected position of the work apparatus.

In example embodiments, the upper sensor may include a LiDAR sensor or a stereo camera sensor.

In example embodiments, the lower sensor may include a radar sensor, an ultrasonic sensor or a stereo camera sensor.

In example embodiments, the obstacle detection control device may calculate the distance to the object based on the data from the upper sensor when the position of the work apparatus is lower than a predetermined position, and may calculate the distance to the object based on the data from the lower sensor when the position of the work apparatus is higher than the predetermined position.

In example embodiments, the obstacle detection control device may transmit the distance information of the object to a planning portion for an unmanned automated work of the wheel loader.

In example embodiments, the work apparatus position detection portion may include a boom angle sensor for detecting a rotation angle of a boom of the work apparatus.

According to example embodiments, in a method of controlling a wheel loader, shape information data for an object in front of a driver cabin is obtained from an upper sensor installed in the driver cabin. Shape information data for an object in front of a front body is obtained from a lower sensor installed in the front body. A position of a work apparatus connected rotatably to the front body is detected. A distance to the object is calculated based on the information data of any one selected from the upper sensor and the lower sensor according to the position of the work apparatus.

In example embodiments, calculating the distance to the object may include calculating the distance to the object based on the data from the upper sensor when the position of the work apparatus is lower than a predetermined position, and calculating the distance to the object based on the data from the lower sensor when the position of the work apparatus is higher than the predetermined position.

In example embodiments, the method may further include transmitting the distance information of the object to a planning portion for an unmanned automated work of the wheel loader.

In example embodiments, the upper sensor may include a LiDAR sensor or a stereo camera sensor.

In example embodiments, the lower sensor may include a radar sensor, an ultrasonic sensor or a stereo camera sensor.

In example embodiments, detecting the position of the work apparatus may include detecting a rotation angle of a boom of the work apparatus.

According to example embodiments, a control system for a wheel loader may include a front obstacle detection device having a first sensor as an upper sensor installed on a driver cabin and a second sensor as a lower senor installed on a front body. The control system may change the sensor for measuring a distance to a front obstacle (truck, hopper) depending on a position of a work apparatus (boom or bucket). That is, when the work apparatus is in a relatively low position, an obstacle detection function by the lower sensor may be turned off and an obstacle detection function by the upper sensor may be turned on to measure the distance to the front obstacle. On the other hand, when the work apparatus is in a relatively high position, the obstacle detection function by the upper sensor may be turned off and the obstacle detection function by the lower sensor may be turned on to measure the distance to the front obstacle.

When the wheel loader travels, the bucket or the boom may be in a relatively low position, so the front of the lower sensor installed in the front body may be obscured by the work apparatus, and thus, the distance to the front obstacle cannot be accurately measured by the lower sensor, and accordingly the distance to the obstacle may be measured through the upper sensor located at the top of the driver's seat. On the other hand, in a posture where the bucket or the boom is raised, such as the loading preparation posture, the front of the upper sensor installed may be obscured by the work apparatus, and thus, the distance to the front obstacle cannot be accurately measured by the upper sensor, but the distance to the obstacle may be measured through the lower sensor installed in the front body.

Accordingly, when the wheel loader performs loading or unloading operation, it may be possible to accurately recognize the distance to a loading box to improve work efficiency. Further, it may be possible to effectively control a vehicle approach distance during the unmanned automation work.

However, the effect of the inventive concept may not be limited thereto, and may be expanded without being deviated from the concept and the scope of the present invention.

BRIEF DESCRIPTION OF THE DRAWINGS

Example embodiments will be more clearly understood from the following detailed description taken in conjunction with the accompanying drawings.

FIG. 2 is a block diagram illustrating a control system for the construction machinery in FIG. 1.

FIG. 3 is a flow chart illustrating a control method for a wheel loader in accordance with example embodiments.

FIGS. 4A and 4B are views illustrating a method of controlling a wheel loader in accordance with example embodiments.

FIGS. 5A and 5B are views illustrating a method of controlling a wheel loader in accordance with example embodiments.

DETAILED DESCRIPTION OF EXAMPLE EMBODIMENTS

Figure 1:
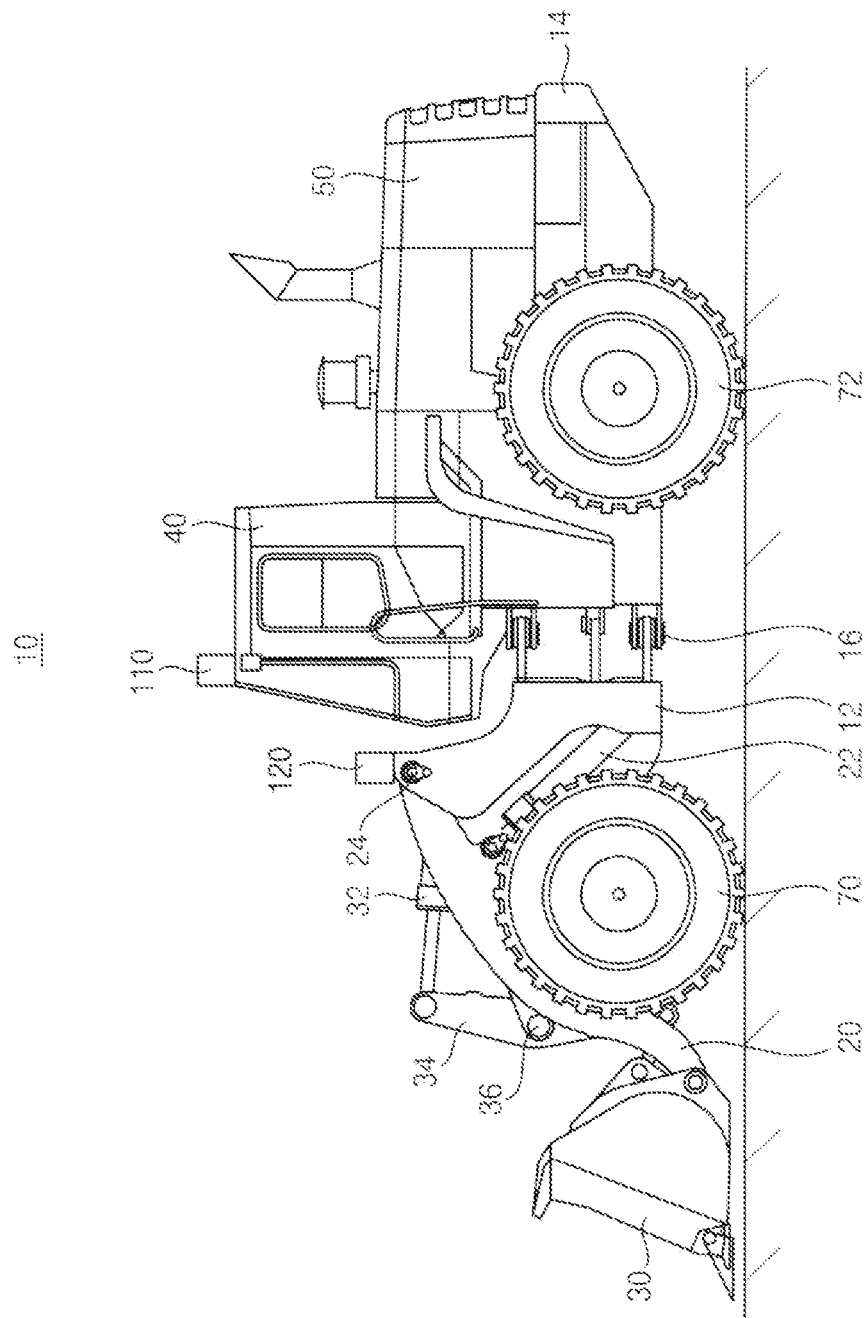
FIG. 1 is a side view illustrating construction machinery in accordance with example embodiments.

Hereinafter, preferable embodiments of the present invention will be explained in detail with reference to the accompanying drawings.

In the drawings, the sizes and relative sizes of components or elements may be exaggerated for clarity.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments may, however, be embodied in many different forms and should not be construed as limited to example embodiments set forth herein. Rather, these example embodiments are provided so that this disclosure will be thorough and complete, and will fully convey the scope of example embodiments to those skilled in the art.

FIG. 1 is a side view illustrating construction machinery in accordance with example embodiments. FIG. 2 is a block diagram illustrating a control system for the construction machinery in FIG. 1. Although a wheel loader 10 is illustrated in FIG. 1, a control device of construction machinery according to example embodiments may not be limited to being used only in the wheel loader, but may be applied to an industrial vehicle such as an excavator, a forklift, etc. Hereinafter, for convenience of description, only the wheel loader 10 will be described.

Referring to FIGS. 1 and 2, a wheel loader 10 may include a front body 12 and a rear body 14 connected to each other. The front body 12 may include a work apparatus and a front wheel 70. The rear body 14 may include a driver cabin 40, an engine bay 50 and a rear wheel 72.

The work apparatus may include a boom 20 and a bucket 30. The boom 20 may be freely pivotally attached to the front body 12, and the bucket 30 may be freely pivotally attached to an end portion of the boom 20. The boom 20 may be coupled to the front body 12 by a pair of boom cylinders 22, and the boom 20 may be pivoted upwardly and downwardly by expansion and contraction of the boom cylinders 22. A tilt arm 34 may be freely rotatably supported on the boom 20, almost at its central portion. One end portion of the tilt arm 34 may be coupled to the front body 12 by a pair of bucket cylinders 32 and another end portion of the tilt arm 34 may be coupled to the bucket 30 by a tilt rod, so that the bucket 30 may pivot (crowd and dump) as the bucket cylinder 32 expands and contracts.

Additionally, the front body 12 and the rear body 14 may be rotatably connected to each other through a center pin 16 so that the front body 12 may swing side to side with respect to the rear body 14 by expansion and contraction of a steering cylinder (not illustrated).

A travel apparatus for propelling the wheel loader 10 may be mounted at the rear body 14. An engine (not illustrated) may be provided in the engine bay 50 to supply an output power to the travel apparatus. The travel apparatus may include a torque converter, a transmission, a propeller shaft, axles, etc. The output power of the engine may be transmitted to the front wheel 70 and the rear wheel 72 through the torque converter, the transmission, the propeller shaft and the axles, and thus the wheel loader 10 may travels.

The transmission may include hydraulic clutches that shift speed steps between first to fourth speeds, and rotation of an output shaft of the torque converter may be shifted by the transmission. The shifted rotation may be transmitted to the front wheel 160 and the rear wheel 162 through the propeller shaft and the axles and thus the wheel loader may travel. The transmission may include a forward hydraulic clutch for forward movement, a reverse hydraulic clutch for reverse movement, and first to fourth hydraulic clutches for the first to the fourth speeds. The hydraulic clutches may be each engaged or released by pressure oil (clutch pressure) supplied via a transmission control unit (TCU). The hydraulic clutches may be engaged when the clutch pressure supplied to the hydraulic clutches is increased, while the hydraulic clutches may be released when the clutch pressure is decreased.

A variable capacity hydraulic pump (not illustrated) for supplying a pressurized hydraulic oil to the boom cylinder 22 and the bucket cylinder 32 of the work apparatus may be mounted at the rear body 14. The variable capacity hydraulic pump may be driven using at least a portion of the power outputted from the engine. For example, the output power of the engine may drive the hydraulic pump for the work apparatus and a hydraulic pump for the steering cylinder via a power transmission device such as a gear train.

A pump control device (EPOS, Electronic Power Optimizing System) may be connected to the variable capacity hydraulic pump, and an amount of the hydraulic oil discharged from the variable capacity hydraulic pump may be controlled by the pump control device. A main control valve (MCV) including a boom control valve and a bucket control valve may be installed on a hydraulic circuit connected to the hydraulic pump. The hydraulic oil discharged from the hydraulic pump may be supplied to the boom cylinder 22 and the bucket cylinder 32 through the boom control valve and the bucket control valve of the main control valve MCV. The main control valve (MCV) may supply the hydraulic oil discharged from the hydraulic pump to the boom cylinder 22 and the bucket cylinder 32 according to a pilot pressure signal in proportion to an operation rate of an operating lever. Thus, the boom 20 and the bucket 30 may be driven by the pressure of the hydraulic oil discharged from the hydraulic pump.

The driver cabin 40 may be installed on the rear body 14 of the wheel loader. A maneuvering device may be provided within the driver cabin 40. The maneuvering device may include an acceleration pedal, a brake pedal, an FNR travel lever, the operating levers for operating the cylinders such as the boom cylinder 22 and the bucket cylinder 32, etc.

As mentioned above, the wheel loader 10 may include a traveling operating system for driving the travel apparatus via the power transmission device and a hydraulic operating system for driving the work apparatus such as the boom 20 and the bucket 30 using the output power of the engine 100.

Hereinafter, a control system for the wheel loader will be explained.

A control system for the wheel loader may include a data acquisition device installed in the wheel loader 10 to obtain shape information data of surrounding terrain or objects, and a data processing device 200 configured to process and provide the information data from the data acquisition device. Additionally, the control system for the wheel loader may further include a control device 300 configured to calculate a distance to the object, etc., based on the provided information data and control operations of the wheel loader 10. Further, the control system for the wheel loader may further include a planning portion 400 configured to provide work information for an unmanned automated work of the wheel loader 10.

The data processing device 200 and the control device 300 of the wheel loader 10 may be provided as an obstacle detection control device. The data processing device 200 and the control device 300 of the wheel loader 10 may be mounted in the rear body 14 as a portion of a vehicle control unit VCU or a separate control unit. The data processing device 200 may be provided separately or integrally with the control device 300. The data processing device 200 and the control device 300 may be implemented with dedicated hardware, software, and circuitry configured to perform the functions described herein. These elements may be physically implemented by electronic circuits such as logic circuits, discrete components, microprocessors, hard-wired circuits, memory elements, wiring connections, and the like.

In example embodiments, the data acquisition device of the obstacle detection control device may acquire environmental data necessary for unmanned or automated operations (loading, dumping, etc.) of the wheel loader 10. The data acquisition device may acquire environmental data for detecting a work terrain and sensing surrounding objects.

The data acquisition device may include an upper sensor 110 installed on an upper surface of the driver cabin 40 and a lower sensor 120 installed on the front body 12. The upper sensor 110 may obtain shape information data for an object in front of the driver cabin 40. The lower sensor 120 may obtain shape information data for an object in front of the front body 12.

The upper sensor 110 and the lower sensor 120 may scan the terrain or object in front of the wheel loader to acquire front ground information and object information. The upper sensor 110 and the lower sensor 120 may output point cloud data (PCD) information to the data processing device 200. The PCD may be data representing the topography of the measured area as points having coordinate values.

The upper sensor 110 may have a first vertical viewing angle (Field of View, FoV) $\theta v1$ and a first horizontal viewing angle based on the front direction of the wheel loader. For example, the first vertical viewing angle may have an angular range of 60 degrees to 120 degrees. The lower sensor 120 may have a second vertical viewing angle $\theta v2$ and a second horizontal viewing angle based on the front direction of the wheel loader. For example, the second vertical viewing angle may have an angular range of 60 degrees to 120 degrees.

For example, the upper sensor 110 may include a LiDAR (Light Detection And Ranging) sensor, a stereo camera sensor, etc., and the lower sensor 120 may include a radar sensor, an ultrasonic sensor, a stereo camera sensor, etc.

The LiDAR sensor may be installed on the upper surface of the driver cabin 40. The LiDAR sensor may recognize an object using a laser light pulse. The LiDAR sensor may provide a resolution capable of detecting a relatively small object. The radar sensor may be installed adjacent to a front head lamp on the front body 12. The radar sensor has advantages of being less affected by the weather. The ultrasonic sensor may be installed in a front central portion of the front body 12. The ultrasonic sensor may accurately recognize a nearby obstacle.

Additionally, various sensors (detectors) may be installed in the wheel loader 10. For example, an engine speed sensor for detecting a rotational speed of the engine, an accelerator pedal detection sensor for detecting an operation amount of an accelerator pedal, a brake pedal detection sensor for detecting an operation amount of a brake pedal, an FNR travel lever position sensor for detecting a manipulation position of an FNR travel lever, for example, the speed steps, forward (F), neutral (N) and reverse (R), a vehicle speed detection sensor, a pressure sensor for detecting a discharge pressure of the hydraulic pump, a boom cylinder pressure sensor for detecting a head side pressure of the boom cylinder 22, a boom angle sensor 24 for detecting a rotation angle of the boom 20, a bucket angle sensor 36 for detecting a rotation angle of the bucket 30, etc. may be installed in the wheel loader 10.

The boom angel sensor 24 and the bucket angle sensor 36 may be provided as a work apparatus position detection portion for detecting a position of the work apparatus. The position (posture) of the work apparatus may include a position of the bucket 30 (a height of the bucket from the ground) or a position of the boom 20 (a rotation angle of the boom).

For example, the boom angle sensor 24 may detect the position of the bucket 30 or the position of the boom 20, that is, information on the height of the bucket 30 or the boom 20 from the ground. The boom angle sensor 24 may detect the rotation angle of the boom 20 and provide information on the elevated height of the bucket or the boom based on the rotation angle of the boom 20. The rotation angle of the boom 20 may be an angle between an extension line at the lowest position the boom 20 (bucket 30) and an extension line at an elevated position of the boom 20. The rotation angle of the boom 20 at the highest position of the boom 20 (max boom height) is the maximum value, and in this case, the boom (bucket) position may be of the maximum height (100%). When the extension line at the elevated position of the boom 20 is parallel with the ground (maximum horizontal reach), the boom (bucket) position may be of the medium height (about 40%).

In example embodiments, the data processing device 200 may receive the shape information data for an object from the upper sensor 110 and the lower sensor 20 and the position information data of the work apparatus (boom 20 or bucket 30) from the boom angle sensor 24. The data processing device 200 may provide the information data from any one selected from the upper sensor 110 and the lower sensor 120 according to the position of the work apparatus, to the control device 300.

The data processing device 200 may select the shape information data from the upper sensor 110 when the position of the work apparatus is lower than a predetermined position (for example, boom height 50%, 60%, 70%) and provide the selected data to the control device 300. The data processing device 200 may select the shape information data from the lower sensor 120 when the position of the work apparatus is higher than the predetermined position (for example, boom height 50%, 60%, 70%) and provide the selected data to the control device 300.

In example embodiments, the control device 300 of the obstacle detection control device may calculate a distance to the object based on the data from the upper sensor 110 and the lower sensor 120 provided from the data processing device 200. The control device 300 may transmit the calculated distance information of the object to the planning portion 400 for unmanned automated work of the wheel loader 10.

The control device 300 may receive topographic information of a work area and work information for an unmanned automated work from the planning portion 400. The work area may be defined as an area for the wheel loader 10 to move and work. The control device 300 may be wirelessly connected to the planning portion 400. For example, the wheel loader 10 may include a wireless transceiver for wireless communication with the planning portion 400. The wireless transceiver may use a known communication standard such as cellular communication such as CDMA and GSM, Wi-Fi, and radio communication.

The control device 300 may determine an area, a volume, or a path (work plan) to be worked on based on the topographic information data and the work information (work types). The control device 300 may output a control signal for executing the determined work plan. The control device 300 may generate and output a control signal corresponding to joint angle values over time of the boom 20 and the bucket 30.

Thus, actuators such as the boom cylinder 22 and the bucket cylinder 32 may be driven by the control valve in response to the control signal to perform a desired operation.

Hereinafter, a method of controlling a wheel loader using the control system for the wheel loader in FIG. 2 will be explained.

FIG. 3 is a flow chart illustrating a control method for a wheel loader in accordance with example embodiments.

Referring to FIGS. 1 to 3, first, in order to perform an unmanned work (loading operation), shape information data for an object in front of a wheel loader 10 may be obtained using an upper sensor 110 and a lower sensor 12 installed in the wheel loader 10 (S100, S110).

In example embodiments, the shape information data for the object may be obtained by scanning a front area of the driver cabin 40 using the upper sensor 110 installed on a driver cabin 40. The shape information data of the object may be obtained by scanning a front area of the front body 12 using the lower sensor 120 installed on the front body 12. For example, the upper sensor 110 and the lower sensor 120 may include a LiDAR sensor, a radar sensor, an ultrasonic sensor a stereo camera sensor, etc.

Then, a position of a work apparatus (boom 20 or bucket 30) may be detected (S120), any one of the upper sensor 110 and the lower sensor 120 may be selected according to the position of the work apparatus (boom 20 or bucket 30) (S130), and then, information data of the selected sensor may be provided (S140, S142). A distance to the object may be calculated based on the provided information data (S150).

In example embodiments, position information data of the boom 20 (or bucket 30) may be received from a boom angle sensor 24. An elevated height of the boom (or bucket) may be determined from a rotation angle of the boom 20 measured by the boom angle sensor 24.

For example, when the position of the work apparatus is lower than a predetermined position (boom height 50%, 60%, 70%), the shape information data from the upper sensor 110 may be selected and the selected data may be provided to the control device 300. When the position of the work apparatus is higher than the predetermined position (boom height 50%, 60%, 70%), the shape information data from the lower sensor 120 may be selected and the selected data may be provided to a control device 300.

The control device 300 may calculate a distance to the object based on the data provided from the upper sensor 110 and the lower sensor 120. The control device 300 may transmit the calculated distance information of the object to a planning portion 400 for unmanned automated work of the wheel loader 10.

FIGS. 4A and 4B are views illustrating a method of controlling a wheel loader in accordance with example embodiments.

Referring to FIGS. 4A and 4B, in order for a wheel loader 10 to perform a loading operation of loading a load onto a dump truck T, a boom 20 may be lifted while the load is contained in a bucket 30.

As illustrated in FIG. 4A, when the wheel loader 10 travels, the bucket 30 may be in a relatively low position. In this case, because the boom position is lower than a predetermined position (for example, 50%, 60%, 70% boom height), shape information data from the upper sensor 110 may be selected and, a distance to the front object (truck) may be measured (calculated) based on the selected data.

As illustrated in FIG. 4B, during the loading operation of the wheel loader 10, the bucket 30 may be in a relatively high position. In this case, because the boom position is higher than the predetermined position (for example, 50%, 60%, 70% boom height), shape information data from the lower sensor 120 may be selected and, a distance to the front object (truck) may be measured (calculated) based on the selected data.

Figure 5B:
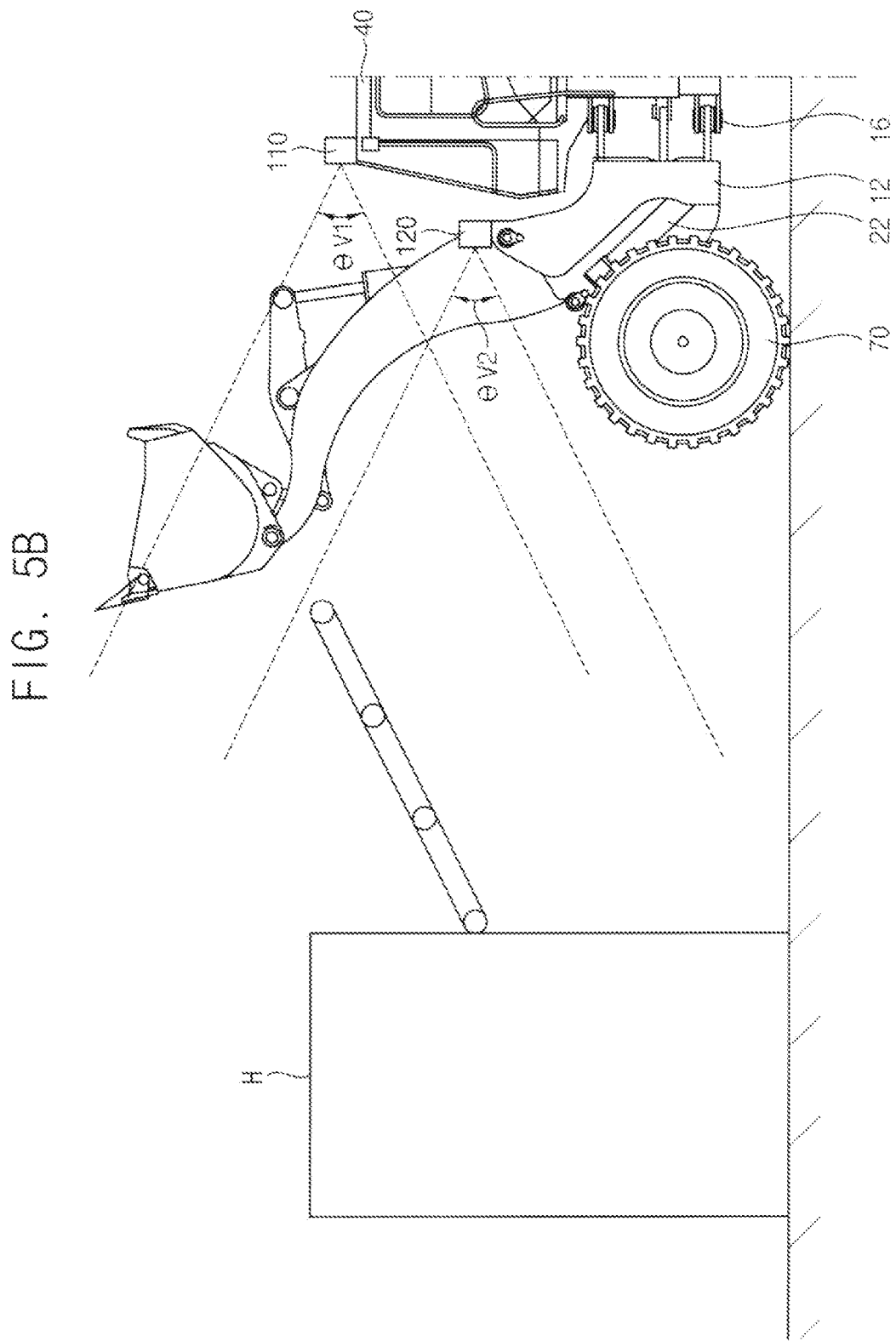

FIGS. 5A and 5B are views illustrating a method of controlling a wheel loader in accordance with example embodiments.

Referring to FIGS. 5A and 5B, in order for a wheel loader 10 to perform a loading operation of loading a load onto a hopper H, a boom 20 may be lifted in the state where the load is contained in a bucket 30.

As illustrated in FIG. 5A, when the wheel loader 10 travels, the bucket 30 may be in a relatively low position, so shape information data from the upper sensor 110 may be selected and, a distance to the front object (truck) may be measured (calculated) based on the selected data.

As illustrated in FIG. 5B, during the loading operation of the wheel loader 10, the bucket 30 may be in a relatively high position, so shape information data from the lower sensor 120 may be selected and, a distance to the front object (truck) may be measured (calculated) based on the selected data.

As mentioned above, a first sensor as the upper sensor 110 installed on the driver cabin 40 and a second sensor as the lower senor 120 installed on the front body 12 may be provided as a front obstacle detection device of the wheel loader 10. Depending on the position of the work apparatus (boom 20 or bucket 30), the sensor for measuring the distance to the front obstacle (truck, hopper) may be changed. That is, when the work apparatus is in a relatively low position, the obstacle detection function by the lower sensor 120 may be turned off and the obstacle detection function by the upper sensor 110 may be turned on to measure the distance to the front obstacle. On the other hand, when the work apparatus is in a relatively high position, the obstacle detection function by the upper sensor 110 may be turned off and the obstacle detection function by the lower sensor 120 may be turned on to measure the distance to the front obstacle.

When the wheel loader travels, the bucket 30 (boom 20) may be in a relatively low position, so the front of the lower sensor 120 installed in the front body 12 may be obscured by the work apparatus, and thus, the distance to the front obstacle cannot be accurately measured by the lower sensor 120, while the distance to the obstacle may be measured through the upper sensor 110 located at the top of the driver's seat. On the other hand, in the posture where the bucket 30 (boom 20) is raised, such as the loading preparation posture, the front of the upper sensor 110 installed may be obscured by the work apparatus, and thus, the distance to the front obstacle cannot be accurately measured by the upper sensor 110, while the distance to the obstacle may be measured through the lower sensor 120 installed in the front body 12.

Accordingly, when the wheel loader performs loading or unloading operation, it may be possible to accurately recognize the distance to the loading box to improve work efficiency. Further, it may be possible to effectively control the vehicle approach distance during the unmanned automation work.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of the present invention. Accordingly, all such modifications are intended to be included within the scope of example embodiments as defined in the claims.

What is claimed is:

1. A control system for a wheel loader, the control system comprising:
   an upper sensor installed in a driver cabin of the wheel loader and configured to obtain shape information data for an object in front of the driver cabin;
   a lower sensor installed in a front body of the wheel loader and configured to obtain shape information data for the object in front of the front body;
   a work apparatus position detector installed in the front body and configured to detect a position of a work apparatus connected rotatably to the front body; and
   an obstacle detection control device having a processor and configured to receive the shape information data from the upper sensor and the lower sensor, and configured to calculate a distance to the object based on the shape information data from the upper sensor and the lower sensor according to the detected position of the work apparatus,
   wherein
   the obstacle detection control device is configured to:
      calculate the distance to the object based on the shape information data from the upper sensor when the detected position of the work apparatus is lower than a predetermined position; and
      calculate the distance to the object based on the shape information data from the lower sensor when the detected position of the work apparatus is higher than the predetermined position, and
   the control system is configured to control the wheel loader to perform loading or unloading operation based on the calculated distance.

2. The control system of claim 1, wherein the upper sensor includes a LiDAR sensor or a stereo camera sensor.

3. The control system of claim 1, wherein the lower sensor includes a radar sensor, an ultrasonic sensor or a stereo camera sensor.

4. The control system of claim 1, wherein the obstacle detection control device transmits the distance information of the object to a planning portion for an unmanned automated work of the wheel loader.

5. The control system of claim 1, wherein the work apparatus position detector includes a boom angle sensor for detecting a rotation angle of a boom of the work apparatus.

6. A method of controlling a wheel loader, the method comprising:
   receiving shape information data for an object in front of a driver cabin of the wheel loader from an upper sensor installed in the driver cabin;
   receiving shape information data for the object in front of a front body of the wheel loader from a lower sensor installed in the front body;
   detecting, by a work apparatus position detector installed in the front body, a position of a work apparatus connected rotatably to the front body; and
   calculating, by a processor, a distance to the object based on the shape information data of any one selected from the upper sensor and the lower sensor according to the detected position of the work apparatus,
   wherein calculating the distance to the object comprises:
      calculating the distance to the object based on the shape information data from the upper sensor when the detected position of the work apparatus is lower than a predetermined position; and calculating the distance to the object based on the shape information data from the lower sensor when the detected position of the work apparatus is higher than the predetermined position, and the method further comprises controlling the wheel loader to perform loading or unloading operation based on the calculated distance.

7. The method of claim 6, further comprising:

transmitting the distance information of the object to a planning portion for an unmanned automated work of the wheel loader.

8. The method of claim 6, wherein the upper sensor includes a LiDAR sensor or a stereo camera sensor.

9. The method of claim 6, wherein the lower sensor includes a radar sensor, an ultrasonic sensor or a stereo camera sensor.

10. The method of claim 6, wherein detecting the position of the work apparatus comprises detecting a rotation angle of a boom of the work apparatus.

* * * * *